(12) United States Patent
Homma et al.

(10) Patent No.: US 8,976,131 B2
(45) Date of Patent: Mar. 10, 2015

(54) INFORMATION PROCESSING DEVICE, DISPLAY CONTROL METHOD, AND PROGRAM

(75) Inventors: Fuminori Homma, Tokyo (JP); Ikuo Yamano, Tokyo (JP); Shunichi Kasahara, Kanagawa (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 172 days.

(21) Appl. No.: 13/472,072

(22) Filed: May 15, 2012

(65) Prior Publication Data

US 2012/0299849 A1 Nov. 29, 2012

(30) Foreign Application Priority Data

May 26, 2011 (JP) ................................. 2011-118344

(51) Int. Cl.
*G06F 3/041* (2006.01)
*G06F 3/033* (2013.01)
*G06F 3/01* (2006.01)
*G06F 3/0488* (2013.01)

(52) U.S. Cl.
CPC .................................. *G06F 3/0488* (2013.01)
USPC ............................ 345/173; 345/157; 715/702

(58) Field of Classification Search
CPC ............................ G06F 3/0416; G06F 3/0488
USPC .................................... 345/173, 684; 715/702
See application file for complete search history.

(56) References Cited

U.S. PATENT DOCUMENTS

| 7,890,863 | B2 * | 2/2011 | Grant et al. .................... 715/702 |
| 8,237,666 | B2 * | 8/2012 | Soo et al. ...................... 345/173 |
| 2006/0161846 | A1 * | 7/2006 | Van Leeuwen ................ 715/702 |
| 2011/0141031 | A1 * | 6/2011 | McCullough et al. ......... 345/173 |

FOREIGN PATENT DOCUMENTS

JP 2008-117371 5/2008

* cited by examiner

*Primary Examiner* — Kumar Patel
*Assistant Examiner* — Kuo Woo
(74) *Attorney, Agent, or Firm* — Sherr & Jiang, PLLC

(57) ABSTRACT

There is provided an information processing device including a display control unit configured to acquire hover coordinates on the touch screen in accordance with a transition of mode to a hover mode, and determine both the acquired hover coordinates and coordinates obtained by adding a desired offset value to the hover coordinates as a range of a hover display to be displayed on the touch screen.

13 Claims, 12 Drawing Sheets

FIG. 4
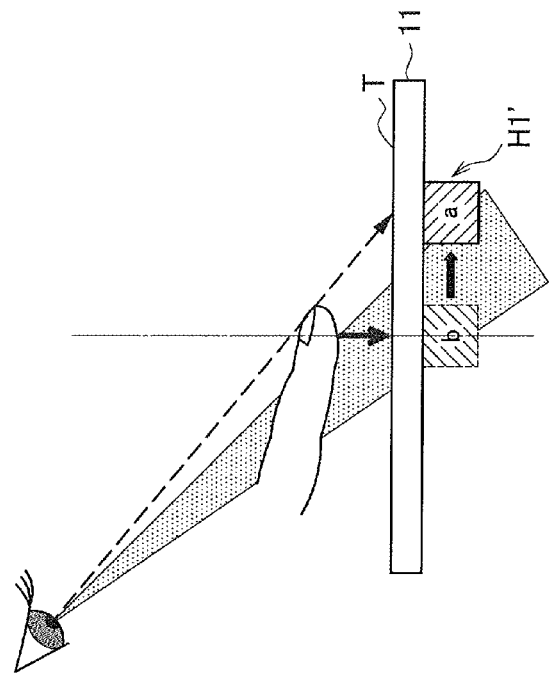
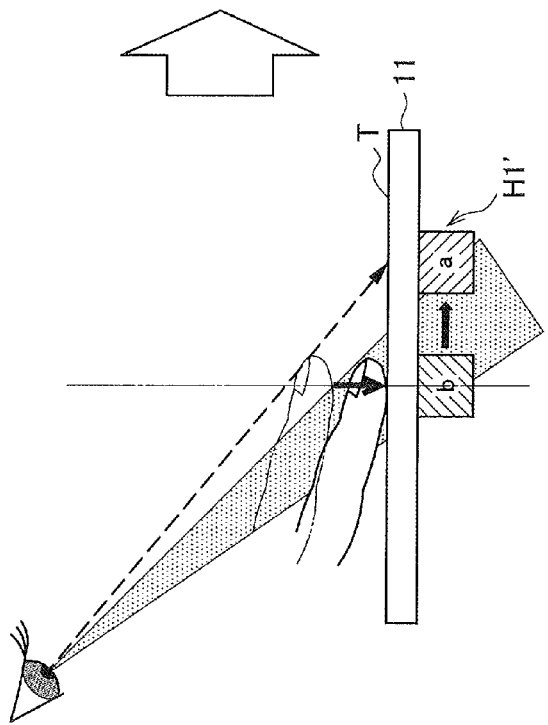

FIG. 5
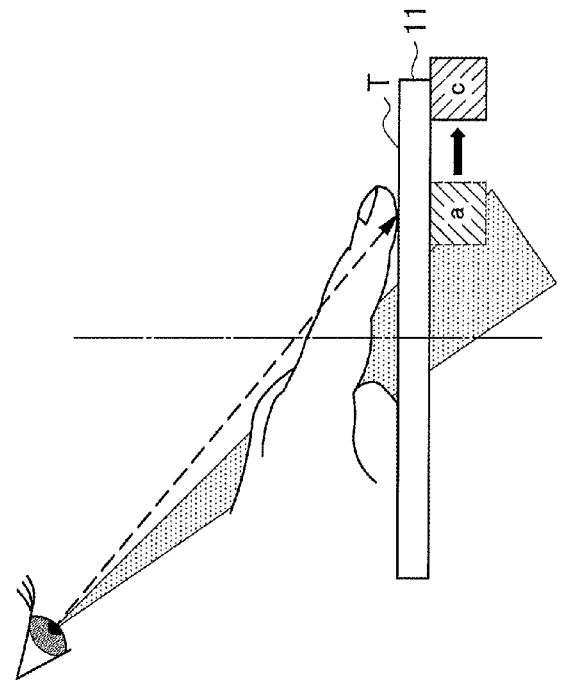
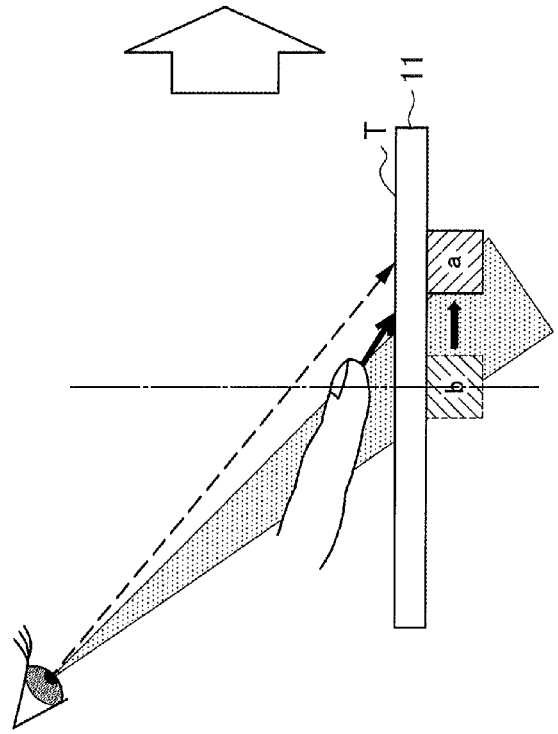

FIG. 11
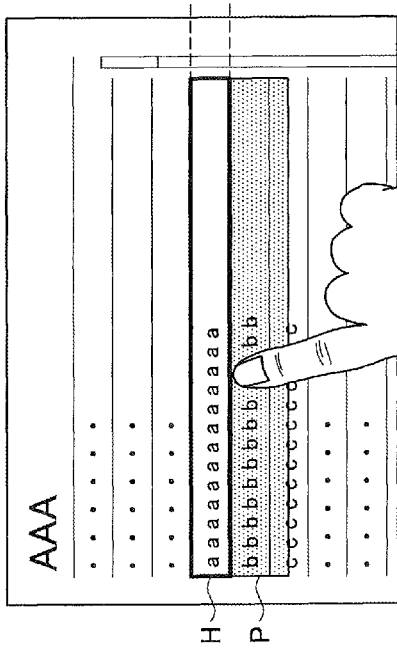
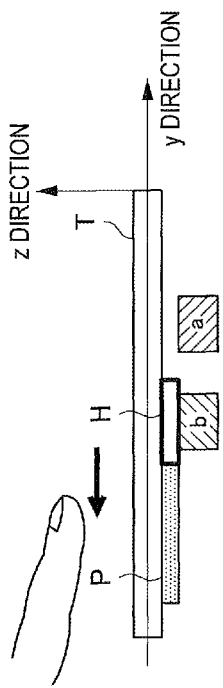
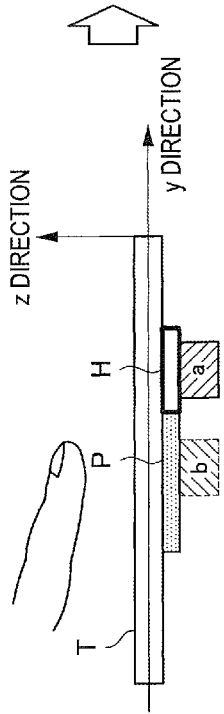

INFORMATION PROCESSING DEVICE, DISPLAY CONTROL METHOD, AND PROGRAM

BACKGROUND

The present disclosure relates to an information processing device, a display control method, and a program.

When operating a touch panel or the like using a finger, a stylus, or the like, it is possible to change the mode of an input operation using a specific operation key provided on the device body or a specific operation region provided on the touch panel. In a normal input operation mode, a release operation performed immediately after a touch corresponds to a normal click of a mouse operation. Examples of mouse operations include not only the click but also an operation of moving only a mouse pointer. A user should selectively use such operations according to circumstances. A mode corresponding to an operation of moving a mouse pointer is referred to as a hover mode, and display performed for an operation of moving the mouse pointer is referred to as a hover display.

Even when a finger or the like does not touch a touch screen, but when a finger or the like gets near the touch screen to a certain degree, if the display state changes in accordance with the distance between the touch screen and the finger, it becomes possible to realize an unprecedented information display state. For example, if a configuration is used in which a mode of the display state is switched between an input operation mode where a finger touches a touch screen and a hover mode in which a finger gets close to the touch screen by a predetermined distance, it becomes possible to perform many types of operations while minimizing the occupied area.

For example, JP 2008-117371A proposes a technique of, using a capacitive display panel, detecting a touch position of a fingertip when the fingertip touches a touch screen of the display panel and detecting the position of the fingertip when the fingertip gets close to the touch screen.

SUMMARY

However, when one moves his/her finger closer to a hover-displayed target (a hover target), the line of sight fixed on the hover target is blocked by the operating finger, so that characters and the like of the hover target are hidden behind the finger and thus it becomes difficult to distinguish whether the hover target correctly responds to the finger operation. Thus, the hover coordinates have been slightly offset so that the hover target is not hidden behind the finger.

However, when the hover coordinates are offset, the hover display position is shifted to the upper side of the finger, so that there arises a gap between the hover display position and the position on the lower side of the finger that is actually easy to be touched. Thus, it is difficult to visually understand whether an operation of touching a position on the lower side of the finger is an operation of touching the hover display position or an operation of physically touching a position on the lower side of the finger, which degrades the operability for the user.

Thus, the hover coordinates have been locked in accordance with a change in position of the finger in the z-direction, and thus it has been determined that when a position right below the finger is touched, the hover display position is touched. However, when the hover coordinates are locked as described above, the lock mechanism would, even when the hover display position is actually touched, determine that the operation is not an operation of touching the hover display position but an operation of touching a position on the upper side of the hover display position, so that an object that is originally intended to be touched cannot be touched directly.

Thus, it has been desired to, in hover display, visually display for a user a touch at which position of the hover coordinates corresponds to the actual touch.

According to an embodiment of the present disclosure, there is provided an information processing device including a display control unit configured to acquire hover coordinates on the touch screen in accordance with a transition of mode to a hover mode, and determine both the acquired hover coordinates and coordinates obtained by adding a desired offset value to the hover coordinates as a range of a hover display to be displayed on the touch screen.

According to an embodiment of the present disclosure, there is provided a display control method including acquiring hover coordinates on a touch screen in accordance with a transition of mode to a hover mode, and determining both the acquired hover coordinates and coordinates obtained by adding a desired offset value to the hover coordinates as a range of a hover display to be displayed on the touch screen.

According to an embodiment of the present disclosure, there is provided a program for causing a computer to execute a process of acquiring hover coordinates on a touch screen in accordance with a transition of mode to a hover mode, and a process of determining both the acquired hover coordinates and coordinates obtained by adding a desired offset value to the hover coordinates as a range of a hover display to be displayed on the touch screen.

According to the present disclosure described above, it is possible to provide a GUI that, in hover display, visually displays for a user a touch at which position of the hover coordinates corresponds to the actual touch.

BRIEF DESCRIPTION OF THE DRAWINGS

FIG. 4 is a diagram illustrating the relationship between a touch position and a hover display position in a hover mode;

FIG. 5 is a diagram illustrating the relationship between a touch position and a hover display position when a lock mechanism is used;

FIG. 11 is a diagram illustrating a movement of a hover display; and

DETAILED DESCRIPTION OF THE EMBODIMENTS

Figure 1:
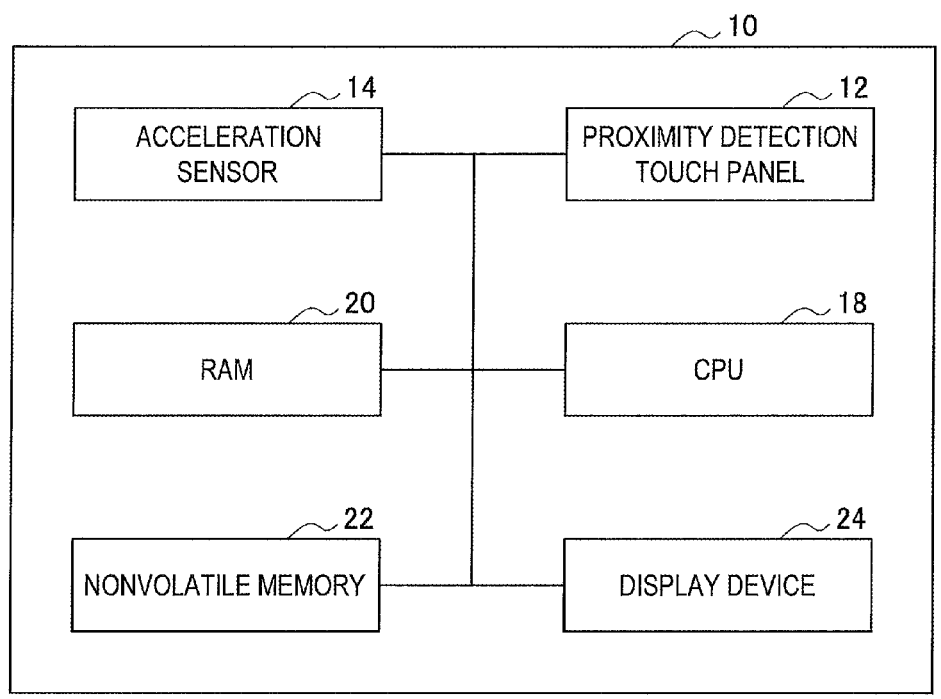
FIG. 1 is a hardware configuration diagram of an information processing device in accordance with an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Fat Finger
2. First Embodiment (Hover Display and Locking)
3. Variation (Hover Display and Locking in which Acceleration in Z Direction is Taken into Account)

<1. Fat Finger>

First, a fat finger will be described. Although a hover cursor will be exemplarily described as an example of a hover display the hover display method may use any figure or image. In addition, although a finger will be described as an example of an input object, the present disclosure is not limited thereto and a stylus or the like may also be used.

Figure 3:
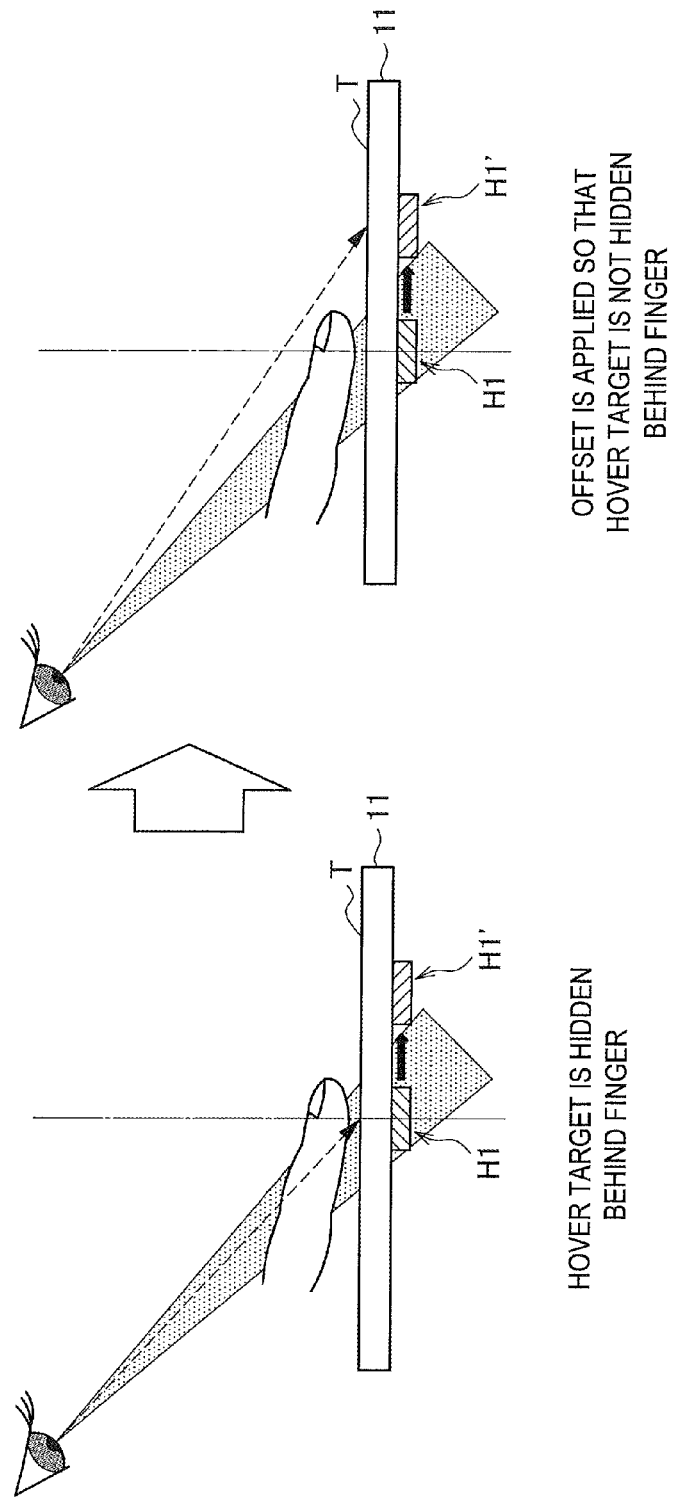
FIG. 3 is a diagram illustrating a fat finger.

As shown in the left view of FIG. 3, when a finger is placed in proximity to a touch screen T of a device body 11, which is a housing of an information processing device, for a period longer than or equal to a predetermined period of time, the mode transitions to the hover mode, and a hover cursor H1 is hover-displayed. The hover cursor H1 is a figure that indicates the position of an object (a hover target) in the hover cursor H1. When the finger moves upward on the touch screen T while being in proximity to the touch screen T without involving a change in position in the z direction, the hover cursor H1 moves following the finger. Then, when the finger changes in position in the z direction and touches the hover cursor H1, an event (coordinate information) is transmitted to the object in the hover cursor H1.

However, when the finger is moved closer to the hover cursor H1, the line of sight fixed on the object in the hover cursor H1 is blocked by the operating finger, so that characters and the like of the hover target are hidden behind the finger and thus it becomes difficult to distinguish whether the hover target correctly responds to the finger operation. This is referred to as a fat finger.

Thus, in order to prevent the line of sight fixed on the hover target from being hidden behind the operating finger, the hover coordinates indicating the position of the hover cursor H1 are slightly offset, so that a hover cursor H1' is displayed on the offset hover coordinates. In the right view of FIG. 3, the hover cursor H1' has moved to a position where the line of sight fixed on the hover target is not blocked by the operating finger. Accordingly, it becomes possible to distinguish whether the hover target correctly responds to the finger.

However, in the state shown in the left view of FIG. 4, an object (a) at a position where the hover cursor H1' is displayed differs from an object (b) that is actually touched. Thus, it is difficult for the user to visually recognize if the object b right below the finger or the object a in the hover cursor H1' responds to an operation of touching a position right downward with the finger.

Thus, a change in position of the finger in the z direction and a lock mechanism are operated in conjunction with each other, and, in accordance with a change in position of the finger in the z direction, the hover coordinates (hover display) at that time are locked, and a touch on a position right below the finger is determined to be a touch on the hover display position. Therefore, as shown in the right view of FIG. 4, when the finger touches a position right downward in the hover mode, control is performed so that the object b right below the finger does not respond but the object a in the hover cursor H1' responds. Accordingly, a "deviation" between the hover display and the touch coordinates is absorbed.

However, when the hover coordinates are locked, even if the hover display position is actually touched, the lock mechanism would determine that the operation is not an operation of touching the hover display position but an operation of touching a position on the upper side of the hover display position. Thus, it is difficult to directly touch the object that is originally intended to be touched. For example, when the hover coordinates are locked in the state shown in the left view of FIG. 5, if the finger touches the object b right downward, it is determined that the object a is touched and thus a touch event is generated. However, when the finger attempts to touch the hover-displayed object a as shown in the right view of FIG. 5, the hover display position is further shifted upward. Thus, if the finger touches the object a, it is determined that the object c is touched and thus a touch event is generated.

<2. First Embodiment>

Thus, the information processing device 10 in accordance with the first embodiment, in the hover mode, visually displays for a user a touch at which position of the hover coordinates corresponds to the actual touch, thereby improving the operability for the user.

First, the hardware configuration of the information processing device 10 in accordance with the first embodiment will be described. Note that the information processing device 10 is a device having mounted thereon sensors that can detect a contact position and a proximity position of a finger of a user and acceleration of the finger. It is acceptable as long as the information processing device 10 is a device with a proximity touch panel such as, for example, a portable phone, a PDA, or a game machine.

(Hardware Configuration)

FIG. 1 shows the hardware configuration of the information processing device 10 in accordance with the first embodiment. The information processing device 10 in accordance with the first embodiment includes a proximity detection touch panel 12, an acceleration sensor 14, a CPU 18, RAM 20, nonvolatile memory 22, and a display device 24.

Figure 2:
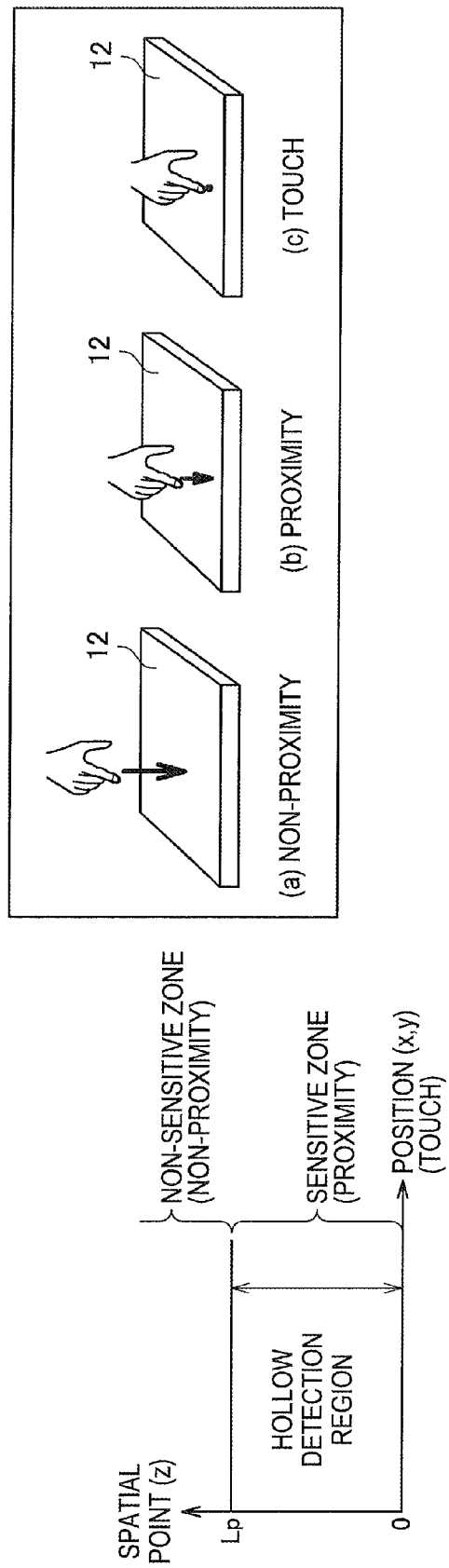
FIG. 2 is a diagram illustrating proximity to and touch on a touch screen.

The proximity detection touch panel 12 is a display panel that can detect proximity. For the proximity detection touch panel 12, a capacitive display panel is used. For example, as shown in FIG. 2, when the distance between the finger and the touch screen of the proximity detection touch panel 12 is longer than a predetermined threshold Lp, the proximity detection touch panel 12 detects nothing (FIG. 2(a): non-proximity state, non-sensitive zone). When the distance between the finger and the touch screen becomes shorter than the threshold Lp and the finger enters an intermediate detection region, the proximity detection touch panel 12 detects the proximity position of the finger (FIG. 2(b): proximity state, sensitive zone). When the finger touches the touch screen, the proximity detection touch panel 12 detects the touch position of the finger (FIG. 2(c): touch state).

As described above, the proximity detection touch panel 12 can detect the proximity position of the finger in the depth direction (coordinates in the z direction) from the touch screen of the proximity detection touch panel 12 and can also detect the contact position (coordinates in the x direction and the y direction) of the finger on the touch screen.

Referring again to FIG. 1, the acceleration sensor 14 is mounted on the device body 11 of the information processing device 10 and calculates the acceleration of the finger with respect to the touch screen of the device body 11 in the depth direction.

A sensor value detected by each of the proximity detection touch panel 12 and the acceleration sensor 14 is transmitted to and stored in the RAM 20 or the nonvolatile memory 22. The CPU 18 is connected to each unit, and acquires various sensor values stored in the RAM 20 or the nonvolatile memory 22, and calculates a finger touch position, a finger proximity position, and acceleration of the finger in the depth direction on the basis of the various sensor values.

In the RAM 20 or the nonvolatile memory 22, a program for executing a touch event process in a hover display, and various data are stored. The CPU 18 executes a touch event process in a hover display by reading and executing the program. The display device 24 hover-displays the position of the offset hover coordinates and a physical touch position on the lower side of the finger. The CPU 18 is connected to the display device 24 and processes information transmitted from the display device 24. On the display device 24, the acquired hover coordinates indicate a physical touch area around a position right below the finger, and an area indicated by the offset hover coordinates is a hover-displayed portion located above the physical touch area. This will be described later. In addition, the "position of the offset hover coordinates" and the "physical touch position on the lower side of the finger" are described below.

(Functional Configuration)

The hardware configuration of the information processing device 10 in accordance with the first embodiment has been described above with reference to FIG. 1. Next, the functional configuration of the information processing device 10 in accordance with the first embodiment will be described with reference to FIG. 6. The information processing device 10 in accordance with the first embodiment includes a display control unit 30 and a storage unit 32.

The display control unit 30 identifies a finger touch position (coordinates in the x direction and the y direction) on the touch screen T of the proximity detection touch panel 12 from a result of detection of the coordinates by the proximity detection touch panel 12. The display control unit 30 identifies a finger proximity position (coordinates in the z direction) with respect to the touch screen T from a result of detection of the depth by the proximity detection touch panel 12. The display control unit 30 acquires acceleration of the finger with respect to the touch screen T in the depth direction from the acceleration sensor 14, and determines if the movement of the hover display should be locked in accordance with the acquired acceleration. The display control unit 30 offsets the hover coordinates by adding an offset value to the hover coordinates.

The storage unit 32 stores the threshold Lp for determining proximity or non-proximity and a table (not shown) for determining an offset value. The display control unit 30 determines an offset value on the basis of the table. In addition, the display control unit 30 acquires the hover coordinates of the touch screen T in accordance with a transition of mode to the hover mode, and determines both the acquired hover coordinates and coordinates obtained by adding a desired offset value to the hover coordinates as a range of a hover display to be displayed on the touch screen T.

(Operation)

Figure 6:
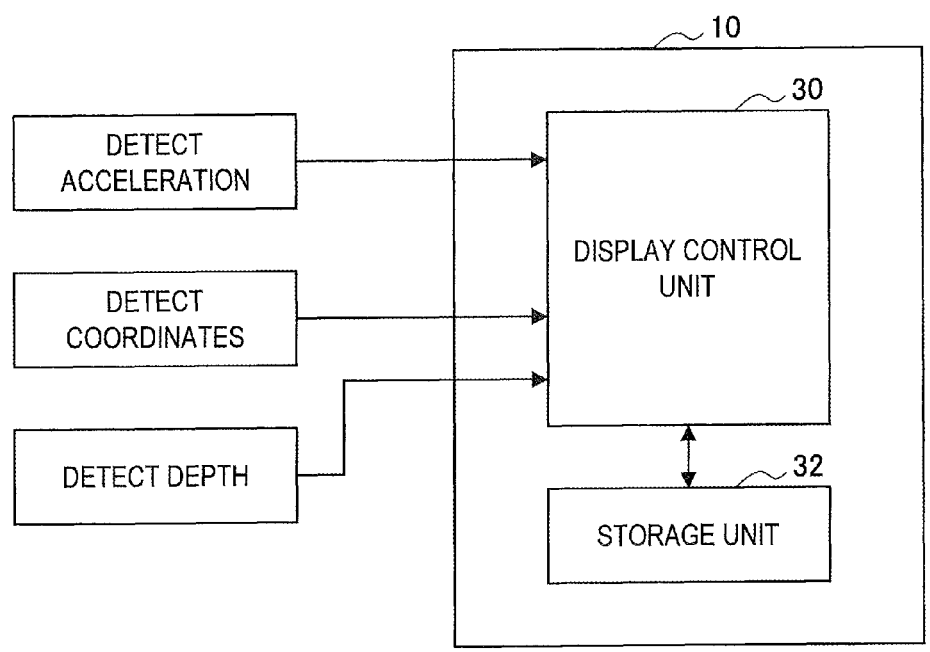
FIG. 6 is a functional configuration diagram of an information processing device in accordance with an embodiment.

The functional configuration of the information processing device 10 in accordance with the first embodiment has been described with reference to FIG. 6. Next, the operation of the information processing device 10 in accordance with the first embodiment will be described with reference to FIG. 7.

Figure 7:
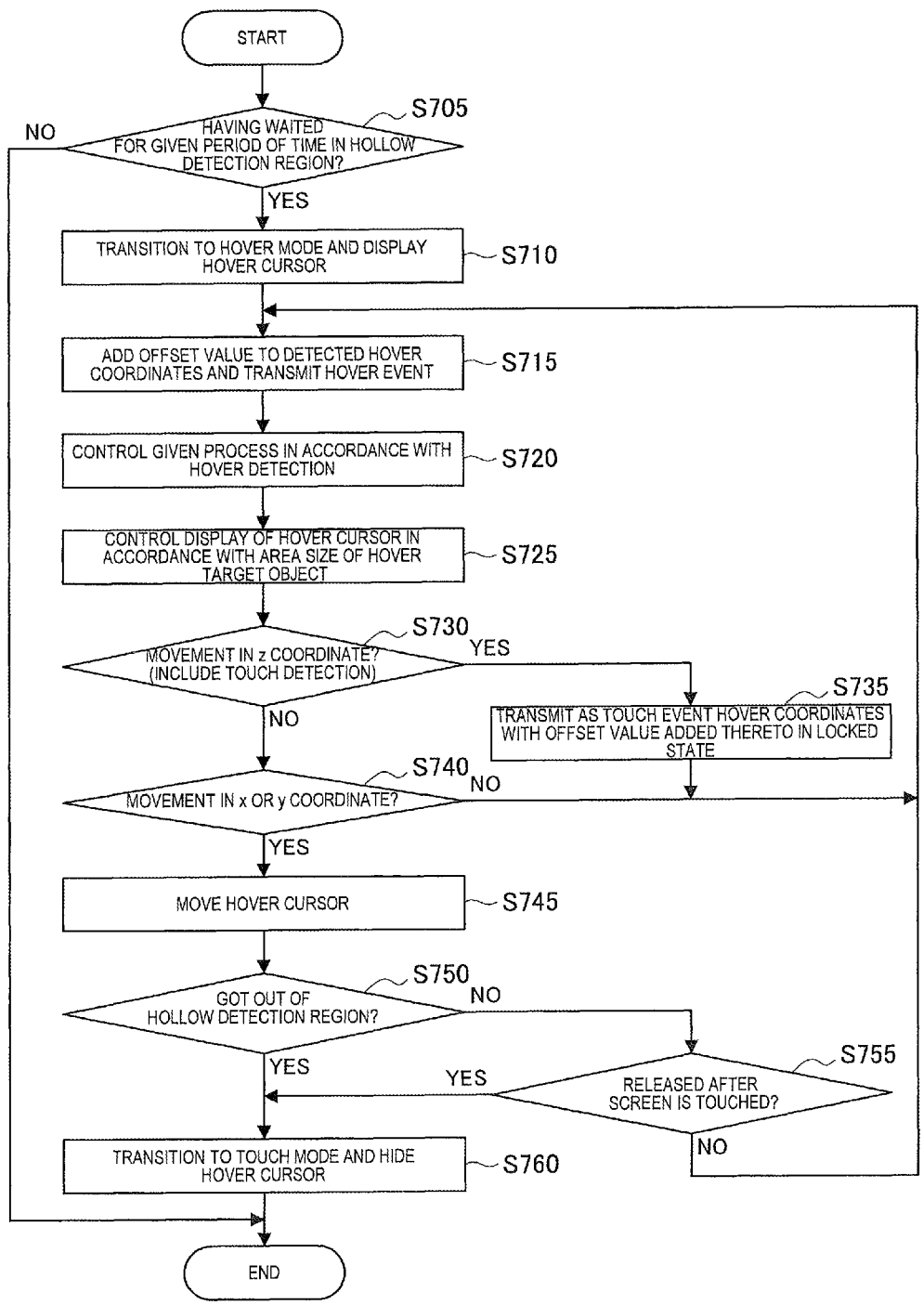
FIG. 7 is a flowchart showing a touch event process in a hover display in accordance with an embodiment.

FIG. 7 is a flowchart showing the operation of the information processing device 10 in accordance with the first embodiment. As shown in FIG. 7, if it is detected that a finger has been waiting for a given period of time within a hollow detection region (S705), the display control unit 30 transitions mode to the hover mode and causes the display device 24 to display a hover cursor (S710). Note that if it is not detected that a finger has been waiting for a given period of time within a hollow detection region in S705, the process terminates.

The display control unit 30 acquires a result of detection of hover coordinates from the proximity detection touch panel 12, adds an offset value to the detected hover coordinates, and transmits a hover event to content (S715). To "transmit a hover event" herein means sending hover coordinate information as an event.

Next, the display control unit 30, upon receiving the hover event on the content side, controls a given process in accordance with the detected hover coordinates (S720). Herein, a given process in accordance with the hover detection means any general process performed when a finger is placed above specific hover coordinates, and may be, for example, lighting a hover cursor or displaying "HELP."

Figure 8:
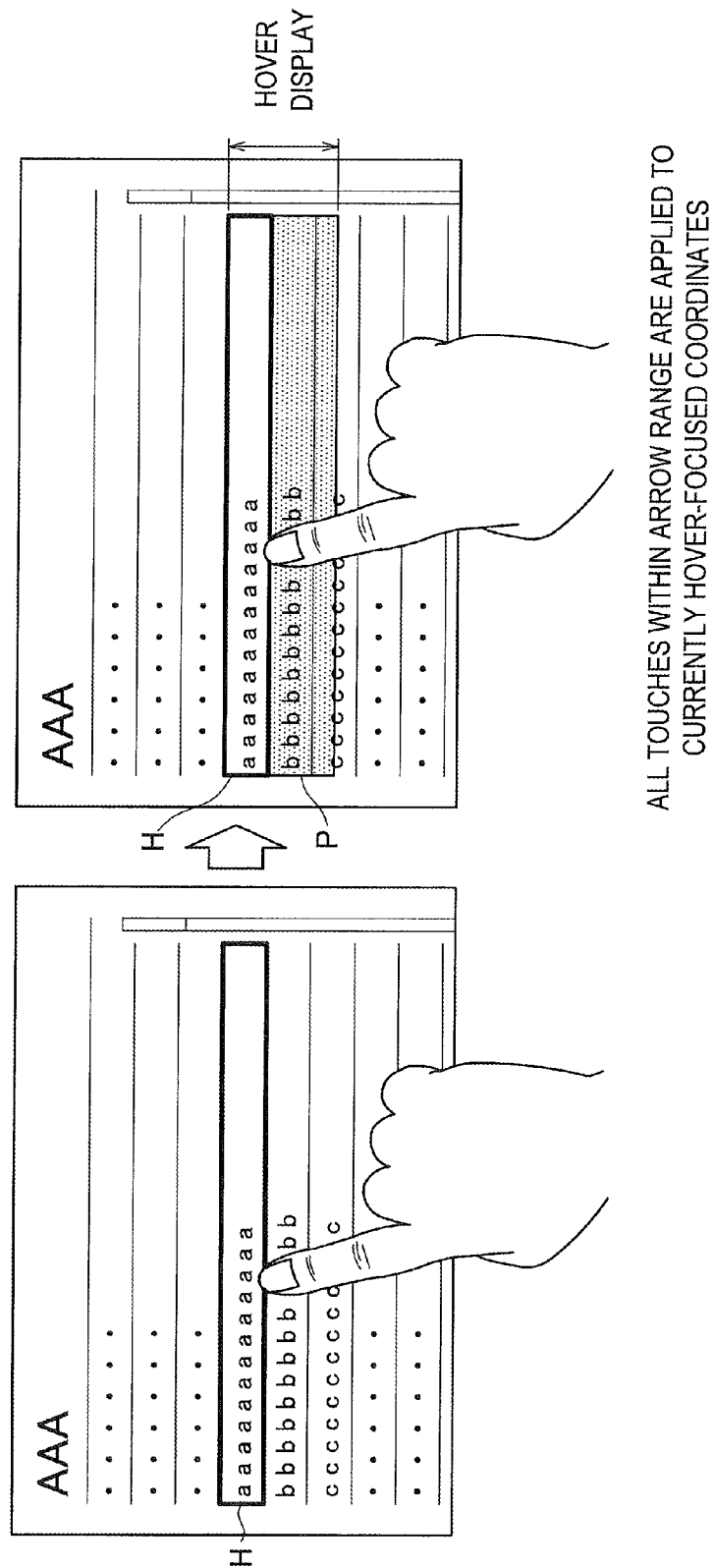
FIG. 8 is a diagram illustrating a hover display.

Next, the display control unit 30 controls the hover display in accordance with an area size of the hover-target object (S725). The hover display will be specifically described with reference to FIG. 8. In a typical hover display after offset, a hover cursor H after offset is displayed above a finger as shown in the left view of FIG. 8. In contrast, in this embodiment, as shown in the right view of FIG. 8, the hover display region is spread across not only the hover cursor H but also an area right below the finger that is an area below the hover cursor H. In addition, in this embodiment, the display control unit 30 performs control so that, in a hover display, a first display portion H displayed on the coordinates, which are obtained by adding a desired offset value to the hover coordinates acquired by the proximity detection touch panel 12, and an area including the hover coordinates before the offset, that is, a second display portion P displayed in an area around a position right below the finger are displayed in a distinguishable manner.

Figure 9:
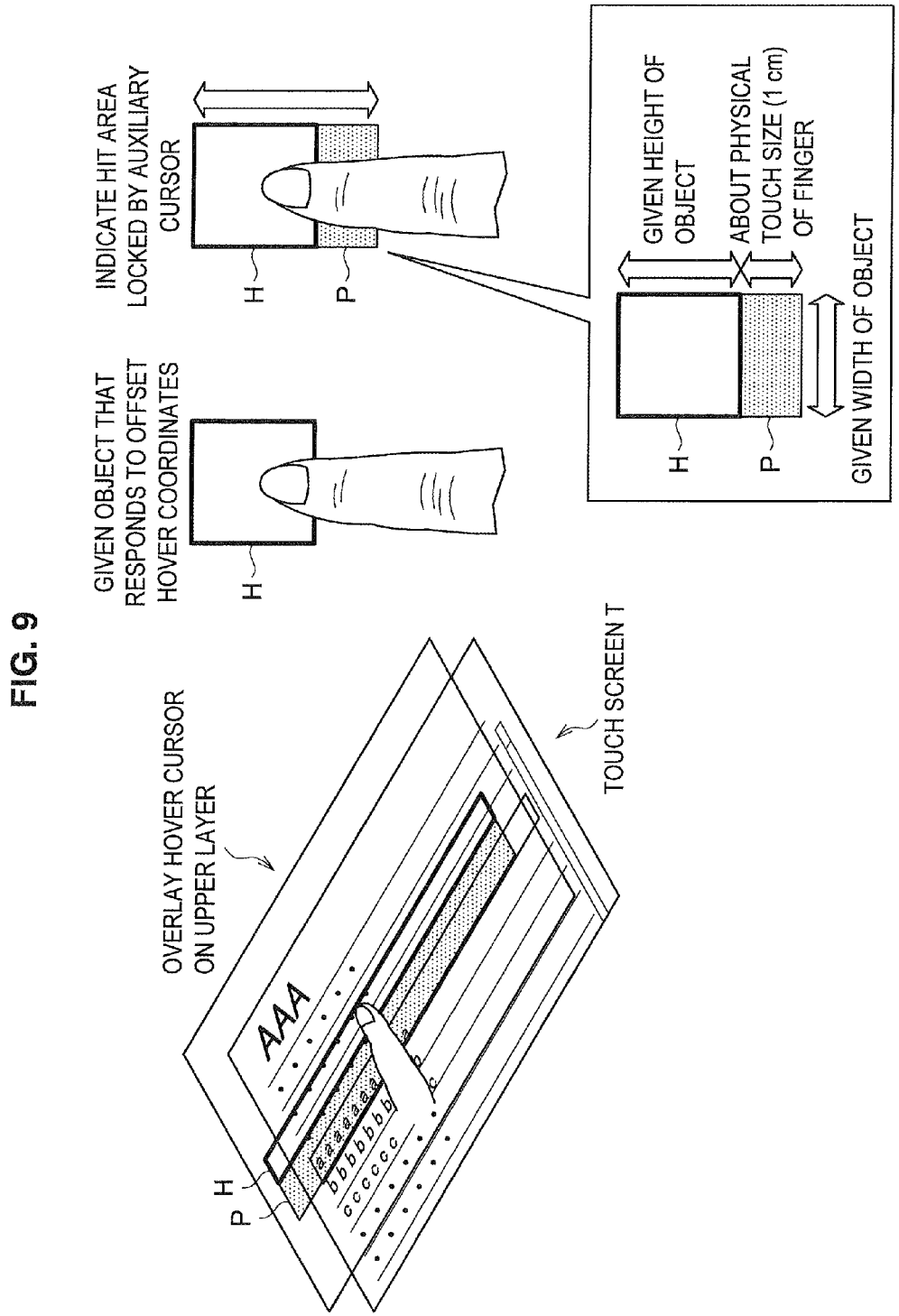
FIG. 9 is a diagram illustrating a hover display.

Hereinafter, the hover display will be further described with reference to FIG. 9. As shown in the left view of FIG. 9, a hover cursor is displayed in an overlapped manner in a proximity portion above the touch screen T. The first display portion H is a transparent or semi-transparent portion that visually shows a given object that responds to the offset hover coordinates, that is, the actual hover target. In this embodiment, a second display portion P formed in a band shape in the longitudinal direction on the lower side of the hover cursor is also an area of the hover display. The display control unit 30, when the finger moves closer to the touch screen in the z direction, displays the hover cursor of the first display portion H at the offset hover coordinates, and the hover cursor of the second display portion P is indicated below the hover cursor of the first display portion H. Note that the length of the height direction of the second display portion P may typically be a physical touch size (1 cm) of a finger, but the present disclosure is not limited thereto.

Accordingly, in the hover mode, regardless of whether the actual touch position is the cursor of the second display portion P or the cursor of the first display portion H, if the actual touch position is within the first display portion H and the second display portion P, it is determined that an object in the cursor of the focused first display portion H is touched. Accordingly, in the hover mode, it is possible to visually display for a user a touch at which position in the hover display corresponds to the actual touch position, and thus prevent malfunction in the hover display.

The cursor of the second display portion P is made more opaque than the cursor of the first display portion H so that the cursor of the second display portion P is distinguished from the cursor of the first display portion H, but the present disclosure is not limited thereto. For example, the cursor of the second display portion P and the cursor of the first display portion H may be displayed as a single area without distinction. Alternatively, after the hover display, if there has been no change in the position of the finger in the z direction for a given period of time, the display color of the second display portion P may be gradually lightened so that display information on the touch screen is made transparent. Meanwhile, when the position of the finger changes in the z direction, the display color may be gradually darkened so that display information on the touch screen is shielded. Further, when the finger moves away from the touch screen T, the display color may be lightened, and when the finger moves closer to the touch screen T, the display color may be darkened. A portion around the base of the finger may be displayed darker and a portion farther from the finger may be displayed lighter.

Referring again to FIG. 7, the display control unit 30 determines from a movement of the finger if the position of the finger has changed toward the touch screen in the z direction (z coordinate) (S730). Determining a change in the z direction (z coordinate) in S730 may include not only detection of proximity to the touch screen but also detection of touch on the touch screen. If it is determined that the position of the finger is changing closer to the touch screen in the z direction, the display control unit 30, assuming that there is an intention to touch, does not detect a movement in the x direction or the y direction, and locks the hover display at that point for a predetermined period of time. Then, the display control unit 30 transmits the hover coordinates with an offset value added thereto as a touch event (S735), returns to S715, and repeats the process from S715.

Figure 10:
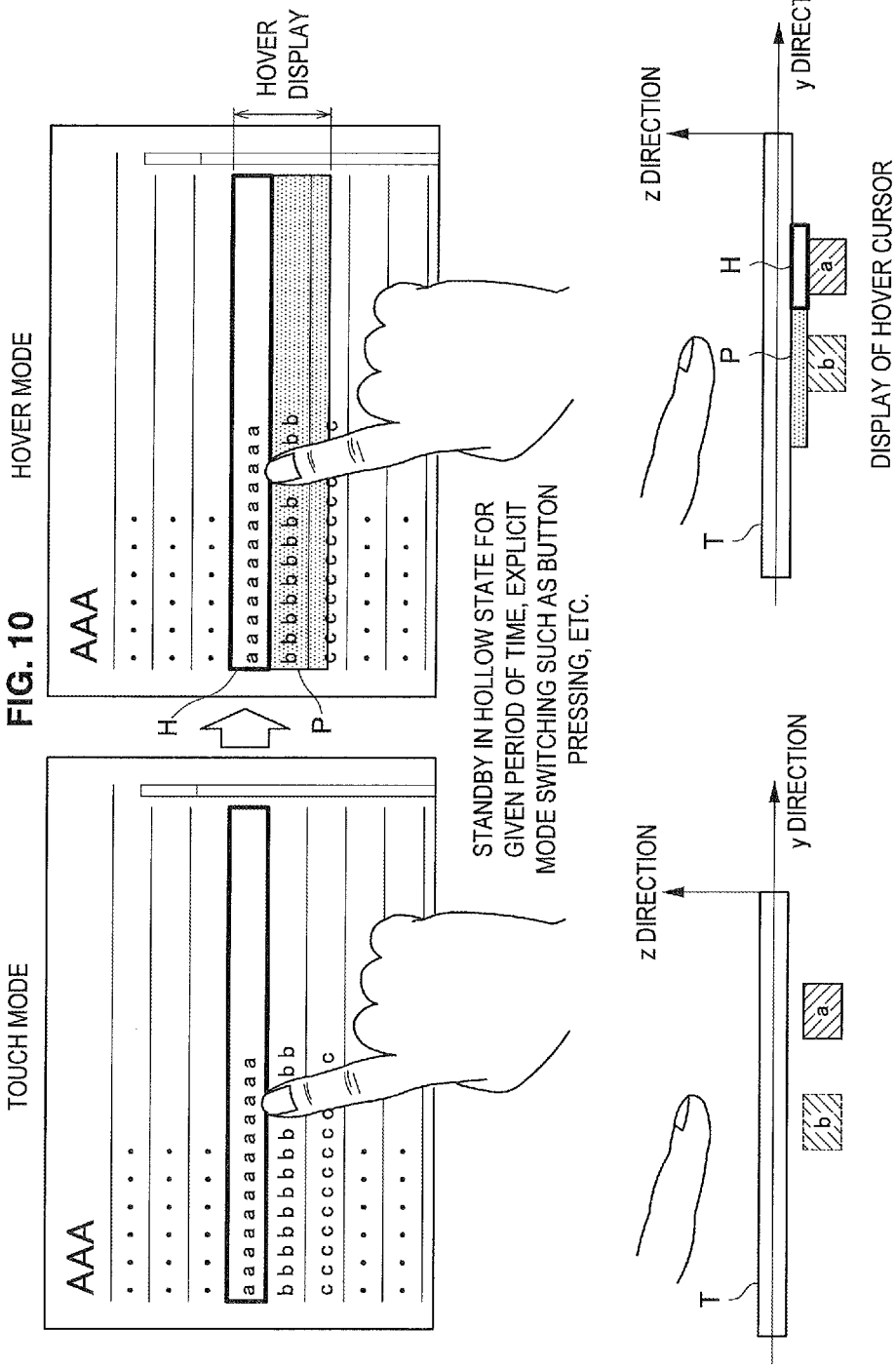
FIG. 10 is a diagram illustrating the operations in a touch mode and a hover mode.

The operation in S735 will be specifically described with reference to FIG. 10. In the touch mode shown in the left view of FIG. 10, a given process is generated for an object at a position that is touched through a finger touch as usual. Meanwhile, if the mode transitions to the hover mode in the right view of FIG. 10 due to standby in the hollow state for a given period of time or explicit mode switching through button pressing or the like, a cursor of the first display portion H and a cursor of the second display portion P are hover-displayed. After the mode transitions to the hover mode, if it is determined that the position of the finger has changed toward the touch screen in the z direction (z coordinate), a movement in the x direction or the y direction is not detected, and the hover display at that point for a predetermined period of time is locked. Then, hover coordinates of the first display portion H obtained by adding an offset value to the detected hover coordinates are transmitted as a touch event.

Meanwhile, if there is no change in the movement of the finger in the z direction (z coordinate) in S730 of FIG. 7, it is determined if there has been a change in the position of the finger at least in the x direction or the y direction (x coordinate or y coordinate) (S740). If there has been no change in the position of the finger in at least the x direction or the y direction (x coordinate or y coordinate), the flow returns to S715, and the process from step S715 is repeated. Meanwhile, if there has been a change in the position of the finger in the x direction or the y direction (x coordinate or y coordinate), the flow proceeds to S745, and the hover cursor is moved. Examples of a display method for moving the hover cursor include increasing the transparency of the hover display of the first display portion H or the second display portion P while the hover display is moving, and decreasing the transparency of the hover display when the hover display stops.

The operation in S745 will be specifically described with reference to FIG. 11. In FIG. 11, when the finger moves while keeping a proximity state without changing position in the z direction, the display at that point in time is not locked, and the hover area moves following the finger upon detection of the movement in the x direction or the y direction. FIG. 11 shows a case in which a change in the finger operation does not occur in the z direction (z coordinate) or the x direction (x coordinate) but occurs only in the y direction (y coordinate). In the left view of FIG. 11, a hover cursor of the first display portion H is displayed at the object a, and a hover cursor of the second display portion P is indicated at the object b below the object a. The object b is an object physically existing on the touch coordinates. Herein, the object a is hover-focused.

The right view of FIG. 11 shows a state in which the position of the finger does not change from the aforementioned state in the z direction (z coordinate) but changes in the y direction (y coordinate). When the finger is moved in a hollow region as described above, the hover focus shifts to the object b following the finger, so that the hover cursor of the first display portion H is displayed at the object b, and the hover cursor of the second display portion P is indicated at the object c below the object b.

As described above, after the hover cursor is moved in S745 in FIG. 7, the display control unit 30 determines if the finger has moved out of the hollow detection region (S750). If it is not determined that the finger has moved out of the hollow detection region, the display control unit 30 determines if a release operation has been performed after the screen (touch screen) is touched (S755). If it is not determined that a release operation is performed after the screen (touch screen) is touched, the flow returns to S715, and the display control unit 30 repeats the process from S715. Meanwhile, if it is determined that a release operation is performed after the screen (touch screen) is touched, the flow proceeds to S760 where the display control unit 30 transitions mode to the touch mode and cancels the hover mode, and terminates the process by hiding the hover display (hover cursor). Note that when it is determined that the finger has moved out of the hollow detection region, the flow also proceeds to S760 and the display control unit 30 transitions mode to the touch mode, and then cancels the hover mode and terminates the process, hiding the hover display.

Figure 12:
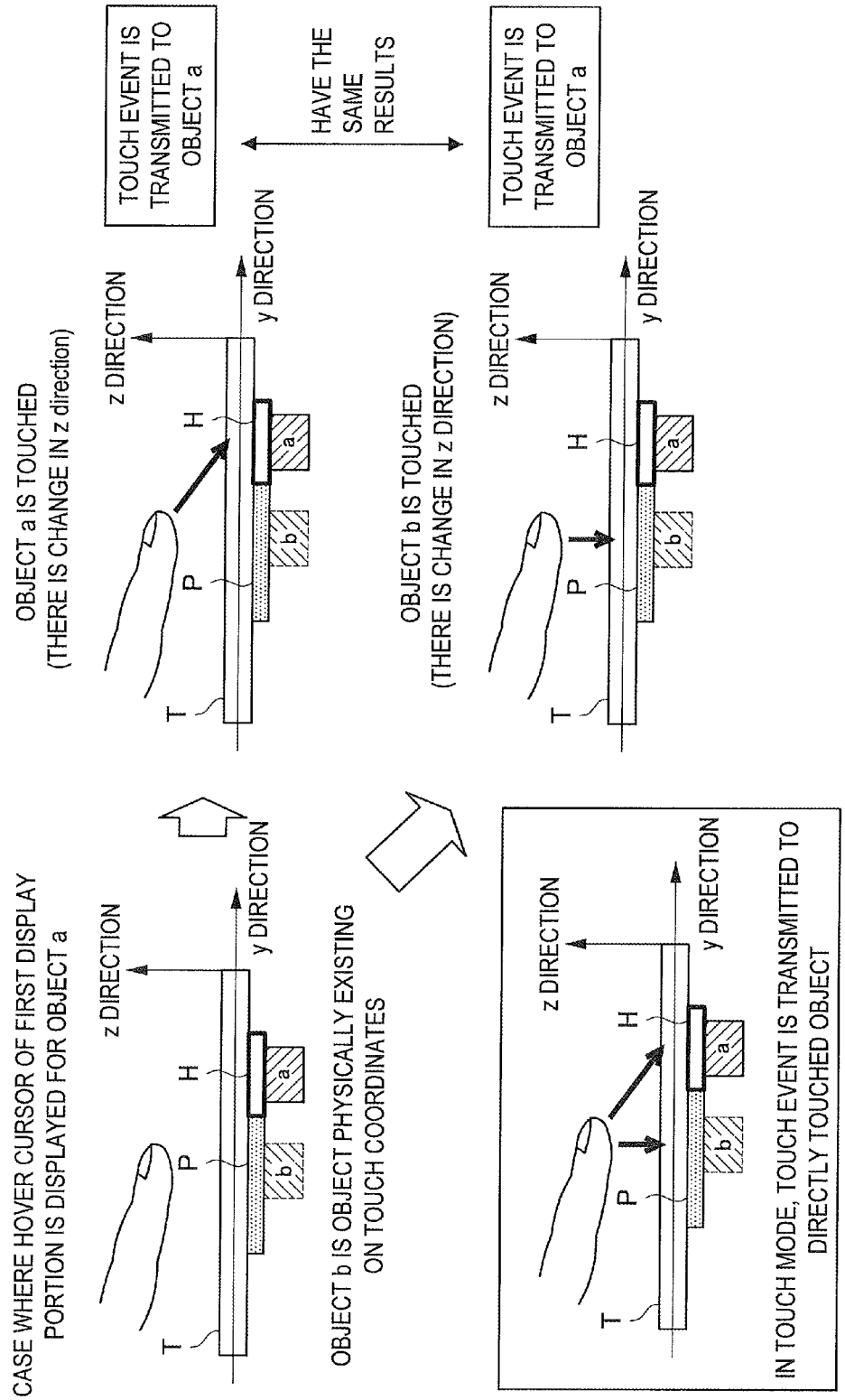
FIG. 12 is a diagram illustrating locking of the movement of a hover display.

As described above, in this embodiment, as shown in the upper left view of FIG. 12, when the hover cursor of the first display portion H is displayed for the object a, if it is determined that the position of the finger has changed in the z direction to a position closer to the touch screen T as shown in the upper right view of FIG. 12, the display control unit 30 locks the hover display at that point for a predetermined period of time, and transmits the hover coordinates with an offset value added thereto to the object a as a touch event. In this case, even when the object a is touched as a result of the position of the finger having changed in the z direction to a position closer to the touch screen T, or even when the object b is touched as a result of the position of the finger having changed in the z direction to a position closer to the touch screen T, a touch event is transmitted to the object a.

Accordingly, regardless of whether the actual touch position is the second display portion P or the first display portion H, if the touch position is within the first display portion H and the second display portion P, it is determined that an object in the first display portion H that is the hover focus target is touched. As described above, by operating the lock mechanism and the hover display in conjunction with each other, it is possible to, in the hover mode, visually display for a user a touch at which position in the hover display corresponds to the actual touch position, and thus prevent malfunction in the hover display.

The lower left view of FIG. 12 shows a comparison between the operation in the touch mode and the operation in the hover mode. In the touch mode, when the touch screen T is touched by a finger, a touch event is transmitted to the directly touched object. That is, when a finger touches the object a on the touch screen T, a touch event is transmitted to the directly touched object a, while when a finger touches the object b on the touch screen T, a touch event is transmitted to the directly touched object b.

(Variation)

In the aforementioned description, in the information processing device 10 in accordance with the first embodiment, when it is determined that the position of a finger is changing closer to the touch screen in the z direction, the display control unit 30, assuming that there is an intention to touch, locks the display at that point for a predetermined period without detecting a movement in the x direction or the y direction, and transmits hover coordinates with an offset value added thereto as a touch event. In contrast, in a variation, the timing of locking the hover display is determined in consideration of the acceleration in the z direction so that the display is not locked frequently.

For example, in a variation, the display control unit 30, when the acceleration of the finger in the z direction is positive, determines that there is an intention to touch, and locks the hover display, and then transmits a touch event. That is, the display control unit 30, when the acceleration of the finger in the z direction is not positive, determines that there is no intention to touch, and thus does not lock the display. Accordingly, in this variation, it is possible to perform control so that the hover display is not locked frequently, further increase the operability for the user, and reduce the load on the process.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1)

An information processing device comprising a display control unit configured to acquire hover coordinates on a touch screen in accordance with a transition of mode to a hover mode, and determine both the acquired hover coordinates and coordinates obtained by adding a desired offset value to the hover coordinates as a range of a hover display to be displayed on the touch screen.

(2)

The information processing device according to (1), wherein the display control unit is configured to control a change in a position of an input object with respect to the touch screen in a depth direction and locking of a movement of the hover display in conjunction with each other.

(3)

The information processing device according to (2), wherein the display control unit is configured to control the locking of the movement of the hover display and the movement of the hover display on the basis of whether the position of the input object with respect to the touch screen has changed in the depth direction.

(4)

The information processing device according to any one of (1) to (3), wherein the display control unit is configured to, in the hover display, perform control so that a second display portion displayed at the acquired hover coordinates and a first display portion displayed at the coordinates obtained by adding the desired offset value to the hover coordinates are displayed in a distinguishable manner.

(5)

The information processing device according to any one of (1) to (4), wherein the display control unit is configured to determine a touch on the first display portion or the second display portion as a touch event on the first display portion.

(6)

The information processing device according to any one of (1) to (5), wherein the display control unit is configured to perform control so that a display state of the hover display changes in accordance with at least one of passage of time or a movement of an input object.

(7)

The information processing device according to (6), wherein the display control unit is configured to perform control so that transparency of the first display portion or the second display portion changes.

(8)

The information processing device according to any one of (2) to (7), wherein the display control unit is configured to acquire acceleration of the input object with respect to the touch screen in the depth direction, and determine if the movement of the hover display is to be locked in accordance with the acquired acceleration.

(9)

A display control method comprising:
acquiring hover coordinates on a touch screen in accordance with a transition of mode to a hover mode; and
determining both the acquired hover coordinates and coordinates obtained by adding a desired offset value to the hover coordinates as a range of a hover display to be displayed on the touch screen.

(10)

A program for causing a computer to execute:
a process of acquiring hover coordinates on a touch screen in accordance with a transition of mode to a hover mode; and
a process of determining both the acquired hover coordinates and coordinates obtained by adding a desired offset value to the hover coordinates as a range of a hover display to be displayed on the touch screen.

The present disclosure contains subject matter related to that disclosed in Japanese Priority Patent Application JP 20011-118344 filed in the Japan Patent Office on May 26, 2011, the entire content of which is hereby incorporated by reference.

What is claimed is:

1. An information processing device comprising:
a display control unit configured to
designate a hover area on a touch screen in accordance with a transition to a hover mode, wherein the transition to the hover mode is based on a proximity position of a user input with the touch screen;
determine both the acquired hover area and a hover offset area, wherein the hover offset area is determined by offsetting the hover area on the touch screen;
lock a position of an input object displayed on the touch screen, wherein the input object is overlapping with the hover offset area based on the proximity position of the user input with the touch screen;
acquire a proximity acceleration of the user input toward or away from the touch screen; and
determine if a movement of the hover area and the hover offset area is to be locked in accordance with the acquired proximity acceleration.

2. The information processing device according to claim 1, wherein the display control unit is configured to control the locking of the position of the input object, the hover area, and the hover offset area on the basis of the proximity position of the user input with respect to the touch screen.

3. The information processing device according to claim 1, wherein the display control unit is configured to visually distinguish to a user the hover area and the hover offset area.

4. The information processing device according to claim 1, wherein the display control unit is configured to determine a touch on the hover area or the hover offset area as a touch event on an input object that is overlapping with the hover offset area.

5. The information processing device according to claim 1, wherein the display control unit is configured to perform control so that a display state of at least one of the hover area and the hover offset area is based on passage of time.

6. The information processing device according to claim 5, wherein the display control unit is configured to perform control to change transparency of at least one of the hover area and the hover offset area.

7. The information processing device of claim 1, wherein the input object is overlapping with the hover offset area and not overlapping with the hover area.

8. The information processing device according to claim 1, wherein the display control unit is configured to perform control so that a display state of at least one of the hover area and the hover offset area based on movement of a user input.

9. The information processing device according to claim 1, wherein the display control unit is configured to lock a position of an input object based on passage of time and proximity position of the user input.

10. The information processing device according to claim 9, wherein the display control unit is configured to lock a position of an input object based on proximity position of the user input remaining substantially static over the passage of time.

11. The information processing device of claim 10, wherein the passage of time is a predetermined passage of time.

12. A display control method comprising:
designating a hover area on a touch screen in accordance with a transition to a hover mode, wherein the transition to the hover mode is based on a proximity position of a user input with the touch screen;
determining both the acquired hover area and hover offset area, wherein the hover offset area is determined by offsetting hover area on the touch screen;
locking a position of an input object displayed on the touch screen, wherein the input object is overlapping with the hover offset area based on the proximity position of the user input with the touch screen;
acquiring a proximity acceleration of the user input toward or away from the touch screen; and
determining if a movement of the hover area and the hover offset area is to be locked in accordance with the acquired proximity acceleration.

13. A non-transitory computer-readable medium having embodied thereon a program, which when executed by a processor of a computer causes the processor to perform a method, the method comprising:
designating a hover area on a touch screen in accordance with a transition to a hover mode, wherein the transition to the hover mode is based on a proximity position of a user input with the touch screen;
determining both the acquired hover area and hover offset area, wherein the hover offset area is determined by offsetting the hover area on the touch screen;
locking a position of an input object displayed on the touch screen, wherein the input object is overlapping with the hover offset area based on the proximity position of the user input with the touch screen;
acquiring a proximity acceleration of the user input toward or away from the touch screen; and
determining if a movement of the hover area and the hover offset area is to be locked in accordance with the acquired proximity acceleration.

* * * * *